(12) United States Patent
Hoffer et al.

(10) Patent No.: US 7,612,536 B2
(45) Date of Patent: Nov. 3, 2009

(54) PRE-SET DISCHARGING OF BATTERIES

(75) Inventors: Cary J. Hoffer, Albany, OR (US);
Memphis-Zhihong Yin, Houston, TX (US); Cynthia K. Head, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/252,669

(22) Filed: Oct. 17, 2005

(65) Prior Publication Data
US 2007/0090806 A1    Apr. 26, 2007

(51) Int. Cl.
*H02J 7/00* (2006.01)
(52) U.S. Cl. .................. 320/133; 320/128; 320/130
(58) Field of Classification Search .......... 320/128, 320/130, 133, 155, 157
See application file for complete search history.

(56) References Cited

U.S. PATENT DOCUMENTS

| | | | | |
|---|---|---|---|---|
| 4,583,035 A | * | 4/1986 | Sloan | 320/146 |
| 4,611,289 A | | 9/1986 | Coppola | |
| 5,589,757 A | * | 12/1996 | Klang | 320/160 |
| 5,958,058 A | | 9/1999 | Barrus | |
| 6,192,480 B1 | | 2/2001 | Barrus | |
| 6,414,465 B1 | * | 7/2002 | Banks et al. | 320/118 |
| 6,741,066 B1 | * | 5/2004 | Densham et al. | 320/145 |
| 2001/0005124 A1 | * | 6/2001 | Odeohhara et al. | 320/116 |

\* cited by examiner

*Primary Examiner*—Edward Tso
*Assistant Examiner*—Aaron Piggush

(57) ABSTRACT

One embodiment relates to a method of pre-set discharging of a battery in a portable device which is connected to external power. The battery is charged until a fully-charged level is reached, and the time at the fully-charged level is tracked. The charging of the battery is halted after a maximum full-charge time period is elapsed. The charging is restarted after a pre-set charge level is reached. Other embodiments are also disclosed.

17 Claims, 4 Drawing Sheets

User interface for
battery life extender utility
400

| | |
|---|---|
| Preset discharge Enable/Disable 404 | Enable |
| Maximum full-charge time period setting 406 | 20 minutes |
| Pre-set charge level setting 408 | 50% |

FIG. 3     300

| User interface for battery life extender utility 400 ||
|---|---|
| Preset discharge Enable/Disable 404 | Enable |
| Maximum full-charge time period setting 406 | 20 minutes |
| Pre-set charge level setting 408 | 50% |

FIG. 4

PRE-SET DISCHARGING OF BATTERIES

BACKGROUND OF THE INVENTION

1. Field of the Invention

The present invention relates generally to laptop computers and other portable electronic products.

2. Description of the Background Art

Computer systems come in many shapes, sizes and computational ability. For persons who work in designated locations, a standard desktop computer may be sufficient to fulfill that person's needs. However, for a user who travels frequently and needs computing power in those travels, a portable or laptop computer is desirable.

Laptop computers are characterized in that the entire computing functionality is incorporated into a single package. That is, the motherboard, hard drive, disk drives, CD ROM drives, keyboard and display are all packaged in a compact device typically weighing less than ten pounds. Laptop computers are fully functional in that they may execute the very same programs, for example word processors and spreadsheet programs, as full sized or desktop computers. Laptop computers have a battery that allows for remote operation of the laptop even in locations where alternating current (AC) wall socket power is not available.

FIG. 1 is a perspective view of a notebook or laptop computer 10. The illustrated laptop computer 10 includes a display panel 11 and a chassis 12. The chassis 12 includes a rechargeable battery 13. The display panel 11 includes a display screen 16 of some type, such as an LCD display screen, and also has mounted therein a light source 15 for delivering light as is known in the art. The chassis 12 also includes a power connector 21 to which an AC adaptor (AC-to-DC power converter) may be connected.

A laptop computer can operate for a limited time using battery power. The limited operational time is because the laptop computer's microprocessor, display screen, and other components require significant power to run, and the laptop battery can only hold a limited amount of power. In order to compensate for the limited operating time using battery power, many users carry around a somewhat cumbersome AC-to-DC power converter (AC adaptor) along with the laptop so as to be able to plug into a conventional power socket when available. These power converters are able to power the laptop computer as well as charge the battery or batteries.

While laptop computers may address portable computing needs, they are not without their limitations and drawbacks. One commonly-experienced drawback is that battery performance and longevity are often far from optimal.

Once a battery of a laptop computer is charged, the charging current is typically reduced to a minimal amount so as to keep the battery charge "topped off" at 100% of its full charge level, or the battery may perhaps be allowed to discharge to a nearly full-charge level (for example, 95%) before resuming charging. Unfortunately, leaving the battery charge at a full-charge level or a nearly full-charge level over an extended period of time tends to degrade the battery such that it is not able to maintain as much charge capacity as it did when it was new.

SUMMARY

One embodiment relates to a method of pre-set discharging of a battery in a portable device which is connected to external power. The battery is charged until a fully-charged level is reached, and the time at the fully-charged level is tracked. The charging of the battery is halted after a maximum full-charge time period is elapsed. The charging is restarted after a pre-set charge level is reached.

Another embodiment relates to a laptop computer apparatus. The apparatus includes at least a power connector configured to be coupled to a power adaptor and to receive power therefrom, a charging regulator coupled to the power connector, a battery coupled to the charging regulator, a processor configured to execute program instructions, and memory configured to store program instructions and data, and a utility application in the memory. The utility application is configured to control the charging regulator such that (a) the battery is charged until a fully-charged level is reached, (b) a time at the fully-charged level is tracked, (c) the charging of the battery is halted after a maximum full-charge time period is elapsed, and (d) the charging of the battery is restarted after a pre-set charge level is reached.

Other embodiments are also disclosed.

BRIEF DESCRIPTION OF THE DRAWINGS

FIG. 4 is a schematic diagram of a user interface for a battery life extender utility in accordance with an embodiment of the present invention.

DETAILED DESCRIPTION

The present application discloses a technique which may be implemented as a software utility application and which is believed to be able to extend battery lifetime for laptop computers. The technique may also be applied to extend battery lifetime for other electronic devices.

The technique allows a battery of a laptop computer to be charged to a full charge level, but then allows a user to limit the amount of time the battery is at the full-charge (or near full-charge) level. When the time limit is reached, the system shuts off the charging current to the battery and allows it to discharge to a pre-set level which may be substantially below the full-charge level. When the pre-set level is reached, charging of the battery is allowed to resume back towards the full-charge level.

Advantageously, this technique provides for the automatic and periodic "conditioning" of a battery in a laptop computer. Such conditioning is helpful in keeping the effective battery capacity higher for a longer period of time. In other words, such conditioning is helpful in extending the useful lifetime of the battery.

A user interface to the software utility application provides a capability for a user to customize the pre-set discharging to suit his or her usage of the laptop computer. An option may be provided which allows the user to specify that the battery be charged to full-charge level and kept at that level.

Figure 1:
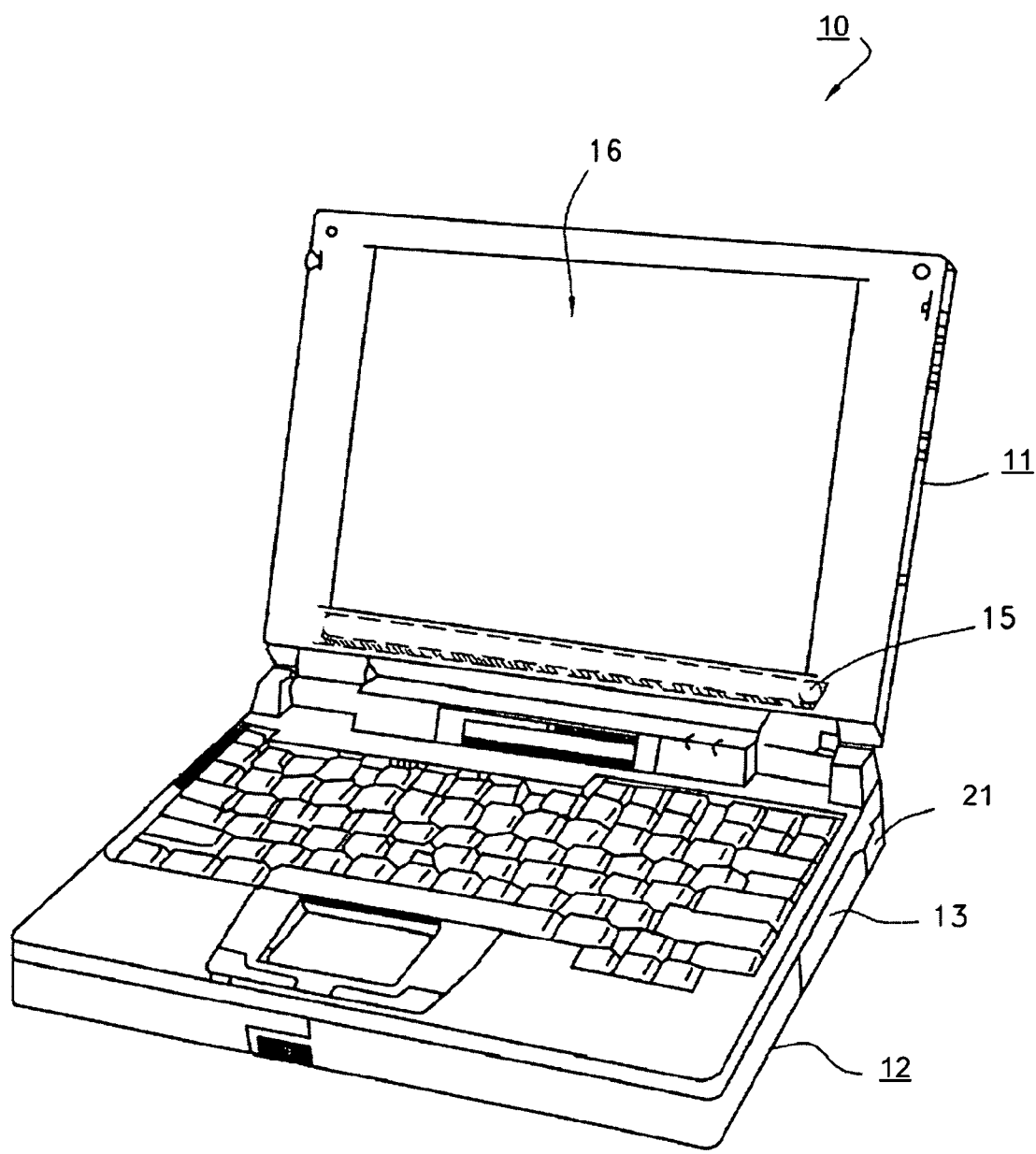
FIG. 1 is a perspective view of a notebook or laptop computer.
Figure 2:
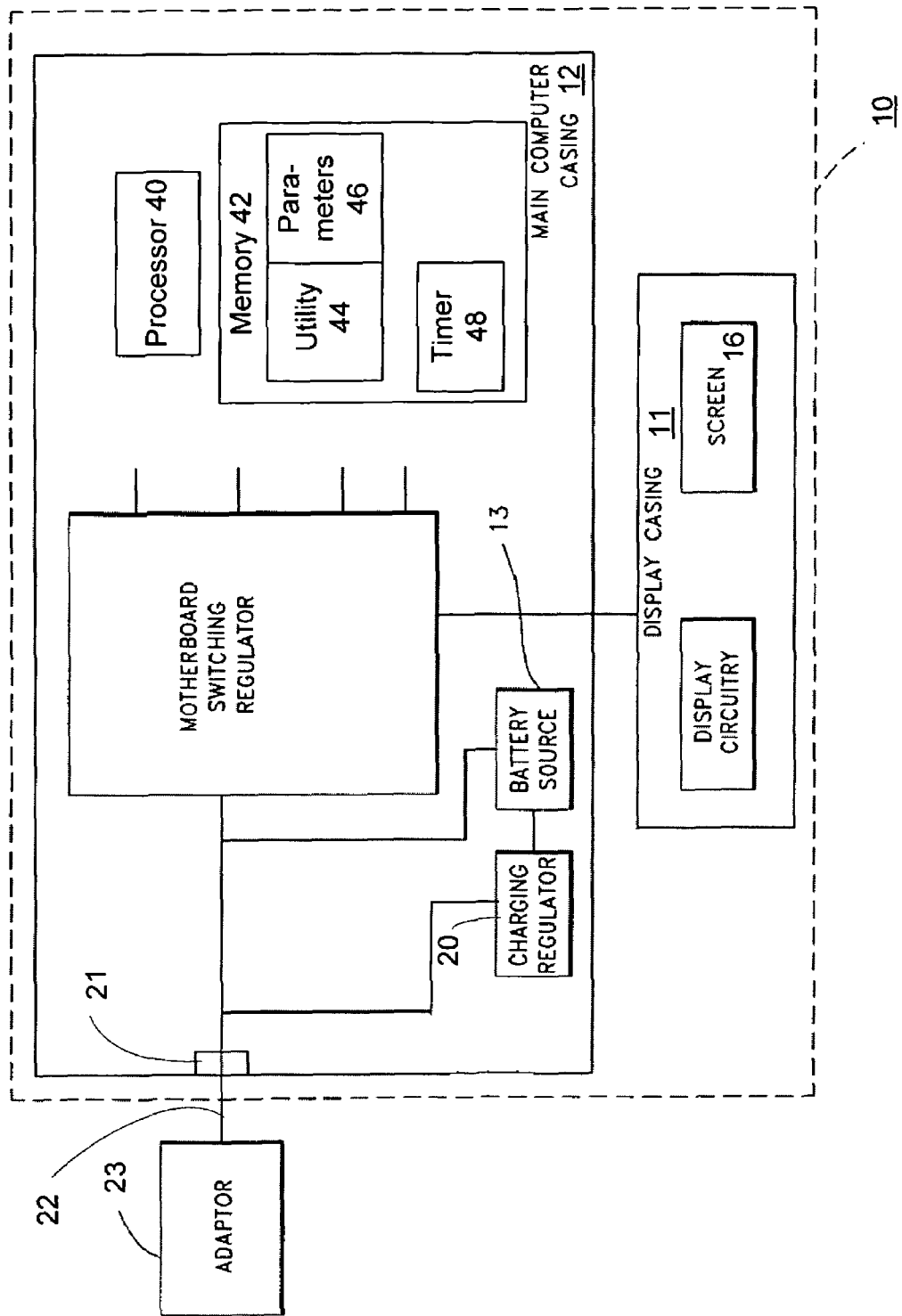
FIG. 2 is a block diagram of the electrical power system of the laptop computer of FIG. 1 in accordance with an embodiment of the present invention.

FIG. 2 is a block diagram of the electrical power system of the laptop computer 10 of FIG. 1 in accordance with an embodiment of the present invention. As shown, the computer 10 (which typically includes a microprocessor as CPU, associated chipset, display screen, and other logic) is capable of receiving power from multiple sources.

The notebook computer 10 is configured to be connected (via a conventional power connector 21 and a conventional cable 22) to a conventional power adaptor 23. The power adaptor 23 is connected to and receives power from a conventional external power source (for example, a wall socket). The power adaptor 23 performs any power conversions that may be necessary (for example, going from 110 volts AC to 15 volts DC), and the motherboard switching regulator of the computer 10 is then supplied powered by this external source. At the same time, the rechargeable battery 13 may also be recharged by the external power source via the charging regulator circuit 20. When the external power source is not available, the computer 10 is powered by the rechargeable battery 13.

The motherboard of the computer 10 also generally includes a processor 40 for executing program instructions and memory 42 for storing the program instructions and various data. The memory may include both volatile and non-volatile memory. In accordance with an embodiment of the present invention, the memory 42 includes a battery life extender utility application 44, stored parameters 46, and timer data 48. For example, the stored parameters 46 may include a maximum full-charge time and a maximum discharge level (or pre-set charge level) for use by the battery life extender utility application 44. The stored parameters 46 may also include an enable/disable flag for the pre-set discharging feature. The utilization of these parameters 46 and the timer 48 to extend the useful life of the battery 13 is described further below.

Figure 3:
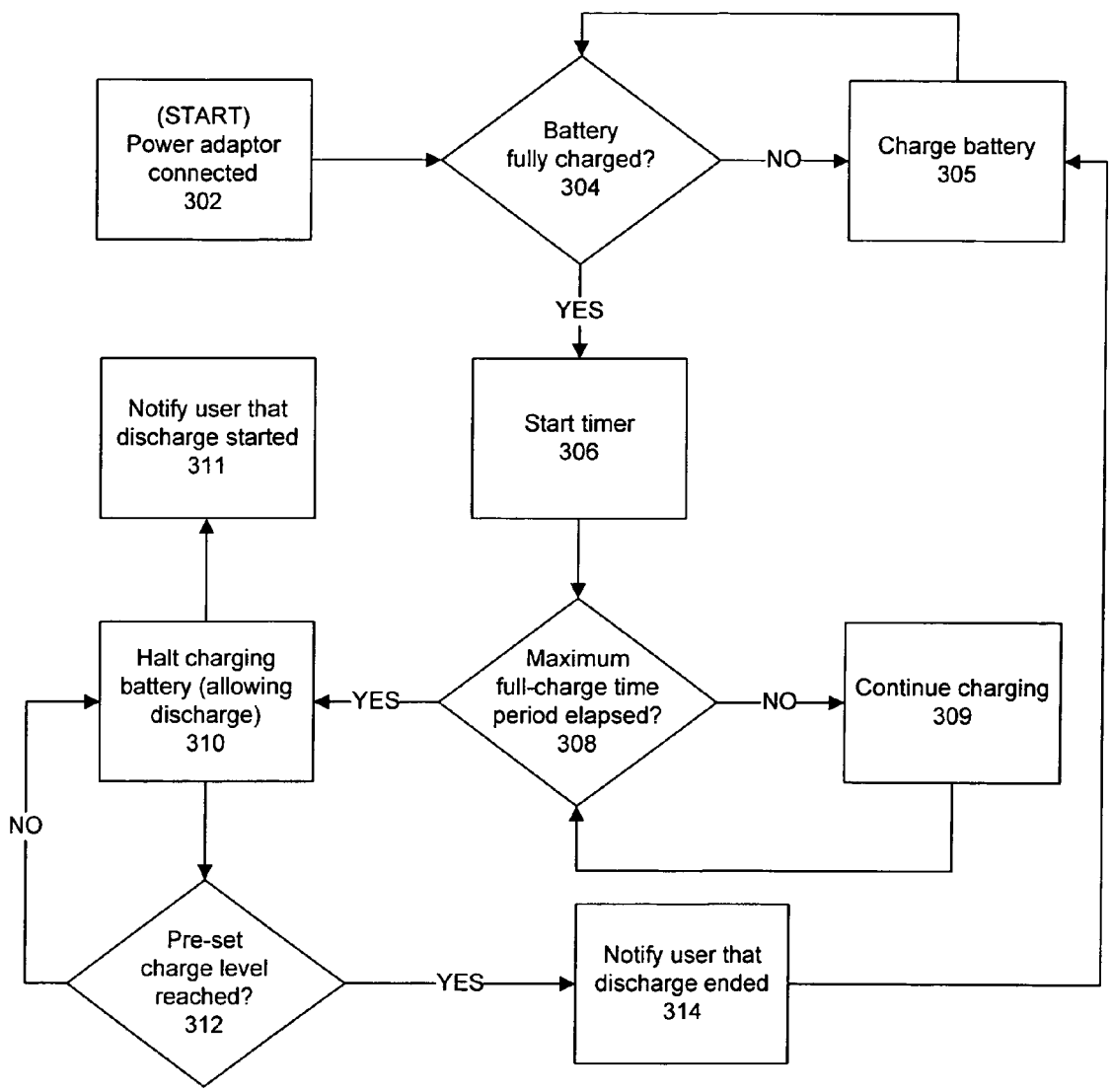
FIG. 3 is a flow chart depicting a method of pre-set discharging of a battery of a laptop computer in accordance with an embodiment of the present invention.

FIG. 3 is a flow chart depicting a method 300 of pre-set discharging of a battery of a laptop computer in accordance with an embodiment of the present invention. The method is applicable, for example, in a laptop computer 10, once its power adaptor 23 is connected 302 so as to provide power to the computer 10. The method may be implemented, for example, using a battery life extender utility 44 which is configured to control the operation of a charging regulator 20.

In accordance with this technique, a determination 304 as to whether the battery 13 is fully charged. If the battery 13 is not fully charged, then the charging regulator 20 may use some of the power from the adaptor 23 to charge 305 the battery. This continues until it is determined 304 that the battery is fully charged.

Once the battery 13 is determined to be fully charged, then a timer may be started 306 to track the time that the battery 13 is in the full-charge condition. The timer may comprise, for example, a software timer 48. The software timer 48 may be started by retrieving a current value of a system clock and storing that value. The software timer 48 may subsequently be checked by retrieving the present value of the system clock and comparing it with the stored value. Alternatively, the timer may be implemented in hardware circuitry.

A determination 308 may then be made as to whether the maximum full-charge time period has elapsed. This determination 308 may be performed by checking the timer and comparing the elapsed time to the pre-set full-charge time period. If the maximum full-charge time period has not elapsed, then the technique continues to charge 309 the battery 13.

Once the maximum full-charge time period elapses, then the technique halts 310 charging of the battery 13, and the user may be notified 311 that the discharge for the purpose of battery conditioning has started. This allows the battery 13 to discharge, for example, due to power supplied to operate the computer 10. The notification 311 may be via an on-screen message and/or may be an audio notification. The notification 311 is optional and an alternate embodiment may not provide it.

A determination 312 may then be periodically made as to whether the charge level of the battery 13 has reached the pre-set charge level. The pre-set charge level corresponds to the minimum level of battery charge allowed during the discharge period. The pre-set charge level may be thought of as a "maximum discharge level." If the pre-set charge level is not yet reached, then the charging remains halted 310. Once the pre-set charge level is reached, then the method 300 may notify 314 the user that the discharging has ended. The notification 314 may be via an on-screen message and/or may be an audio notification. The notification 314 is optional and an alternate embodiment may not provide it. The method 300 may then go back and charge 305 the battery back to a full capacity level.

In one embodiment, options may be provided for the user to temporarily ("charge now") or permanently disable the pre-set discharging. For example, such options may be provided in an "Advanced" tab or screen of a user interface. If the pre-set discharging is disabled, then the battery 13 is charged and kept at a full charge level without regards to the maximum full-charge time period. The "charge now" (temporary disablement) option is particularly useful, for example, if a user was leaving the office to travel and wanted his or her laptop computer to be fully charged before the trip.

In one embodiment, a notification may be provided to the user when the maximum full-charge time period is not likely to be reached due to high-performance (i.e. high power usage) applications being run. For example, such high-performance applications may include an application which has a very high usage of the CPU and/or graphics capability of the computer.

If during the performance of the method 300 of FIG. 3, the power adaptor is disconnected, then the method 300 is terminated as the laptop computer 10 is no longer connected to an external power source for charging the battery. The method 300 may then restart at block 302 if the adaptor is re-connected to the laptop computer 10.

FIG. 4 is a schematic diagram of a user interface 400 for a battery life extender utility in accordance with an embodiment of the present invention. The user interface illustrated is a simplified version for explanatory purposes. An actual implementation of the user interface may vary depending upon various design considerations.

As depicted, the user interface 400 may provide various fields for a user to make selections. The fields may include an enable/disable field 404 for a user to enable or disable the pre-set discharging feature. If enabled, then the pre-set discharging method 300 may be applied. If disabled, then the battery may be charged conventionally, for example, without limiting the time at full-charge or near full-charge status. The disabling may be either "permanent" so as to turn the feature off, or "temporary" so as to temporarily disable the feature. If the feature is turned off "permanently", then the system may be configured to remind the user periodically (for example, after a certain number of hours or days) with a notification that the pre-set discharging feature is disabled. This may help extend battery life by reminding the user to turn the pre-set discharging feature back on when it is convenient to him or her.

The fields of the user interface 400 may also include a maximum full-charge time period setting 406. This field 406 may be used to set the maximum full-charge time period which is utilized in block 308 of FIG. 3 in accordance with an embodiment of the invention. For example, the maximum full-charge time period may be set to one hour, or to another time period.

The shorter the full-charge time period is set, the more frequently will the battery be allowed to go through a "conditioning cycle." If the user prefers to have infrequent conditioning cycles due to his or her frequent usage of the laptop computer under battery power, the full-charge time period may be set to a long time (for example, three hours) so that a conditioning cycle begins only after the laptop computer operates for a long time at full-charge.

The fields of the user interface 400 may also include a pre-set charge level (which may be called the maximum discharge level) setting 408. This field 408 may be used to set the pre-set charge level which is utilized in block 312 of FIG. 3 in accordance with an embodiment of the invention. For example, the pre-set charge level may be set to 50% of the full charge level for the battery 13, or to another charge level at the choice of the user.

The lower that the pre-set charge level is set, the more effective the conditioning of the battery is likely to be. For example, the pre-set charge level may be set to a lower level (such as 10%, 15%, 20% or 25%) of the full-charge level so as to achieve more effective battery conditioning. If the user prefers not to have such a low charge level due to his or her usage of the laptop computer under battery power, the pre-set charge level may be set to a higher level (such as 75%, 80%, 85% or 90%) of the full-charge level so as to maintain a higher minimum charge level while the laptop is plugged into power from the adaptor.

In one embodiment, if the pre-set charge level is set to a relatively shallow discharge (for example, to 50% capacity) by the user, then the user may be periodically reminded that performing a deep discharge (for example, to 10% of capacity) would help extend the useful battery life. For example, a counter may be used to track the number of shallow discharges, and after a certain number of such shallow discharges, the computer may prompt the user to perform a deep discharge (for example, to 10% of capacity).

Although the above discussion focuses on recharging a laptop computer, alternate embodiments of the invention may involve adaptation of the apparatus and method so as to recharge a tablet or palmtop computer, personal digital assistant (PDA) devices, digital cameras, MP3 players, cellular phones, or other portable electronic devices.

Of particular use for devices without direct keyboard connect, an embodiment of the invention may provide a user with a finite set of options. The options may include, for example: a) a "top-off" mode of fully charging the battery as in the conventional case; b) an "avoid top-off" mode of discharging to a pre-set level of 90% battery capacity (10% discharge) per the technique disclosed herein; and c) a "condition battery" mode of discharging to a pre-set level of 10% battery capacity (90% discharge) per the technique disclosed herein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A portable battery-powered computing apparatus comprising:
    a power connector on the portable battery-powered computing apparatus, the connector being configured to be coupled to a power adaptor and to receive power therefrom;
    a charging regulator in the portable battery-powered computing apparatus, the charging regulator being coupled to the power connector;
    a battery in the portable battery-powered computing apparatus, the battery being coupled to the charging regulator;
    a processor in the portable battery-powered computing apparatus, the processor being configured to execute program instructions;
    memory in the portable battery-powered computing apparatus, the memory being configured to store program instructions and data; and
    processor-executable instructions in the memory which are configured to control the charging regulator such that (a) the battery is charged until a fully-charged level is reached, (b) a time at the fully-charged level is tracked, (c) the charging of the battery is halted after a maximum full-charge time period is elapsed, and (d) the charging of the battery is restarted after a pre-set charge level is reached, wherein the pre-set charge level is in a range of 10% to 25% of the fully-charged level so as to achieve battery conditioning.

2. The apparatus of claim 1, wherein the processor-executable instructions are configured to track the time by starting a timer when the fully-charged level is reached and using the timer in determining whether the maximum full-charge time period is elapsed.

3. The apparatus of claim 1, wherein the processor-executable instructions are further configured to notify a user when the charging of the battery is halted.

4. The apparatus of claim 3, wherein the processor-executable instructions are further configured to notify the user when the charging of the battery is restarted.

5. The apparatus of claim 1, wherein the maximum full-charge time period is selectable by way of a user interface.

6. The apparatus of claim 1, wherein the pre-set charge level is selectable by way of a user interface.

7. The apparatus of claim 1, wherein the discharging of the battery is enabled or disabled by way of a user interface.

8. The apparatus of claim 1, wherein the discharging is temporarily disabled at option of a user.

9. The apparatus of claim 1, wherein the apparatus comprises a portable personal computer device.

10. A portable personal computer comprising:
    a power connector configured to be coupled to an AC-to-DC power adaptor and to receive power therefrom;
    a motherboard switching regulator coupled to the power connector and to a motherboard of the personal computer;
    a charging regulator coupled to the power connector;
    a battery coupled to the charging regulator;

a processor configured to execute program instructions;

memory configured to store program instructions and data;

computer-readable data in the memory which is configurable to indicate whether pre-set discharging is enabled for the personal computer; and processor-executable instructions in the memory which are configured to control the charging regulator such that (a) the battery is charged until a fully-charged level is reached, (b) a time at the fully-charged level is tracked, (c) if the preset discharging is enabled, then the charging of the battery is halted after a maximum full-charge time period is elapsed, and the charging of the battery is restarted after a pre-set charge level is reached, wherein the pre-set charge level is in a range of 10% to 25% of the fully-charged level.

11. The portable personal computer of claim 10, wherein the processor-executable instructions are further configured to track the time by starting a timer when the fully-charged level is reached and using the timer in determining whether the maximum full-charge time period is elapsed.

12. The portable personal computer of claim 10, wherein the processor-executable instructions are further configured to notify a user via an on-screen message when the charging of the battery is halted so as to perform the pre-set discharging.

13. A portable battery-powered computing apparatus comprising:

power connector means, on the portable battery-powered computing apparatus, for coupling to a power adaptor and for receiving power therefrom;

charging regulator means, in the portable battery-powered computing apparatus, for coupling to the power connector;

battery means, in the portable battery-powered computing apparatus and being coupled to the charging regulator means;

processor means, in the portable battery-powered computing apparatus, for executing program instructions;

memory means, In the portable battery-powered computing apparatus, for storing program instructions and data; and means for controlling the charging regulator means such that (a) the battery means is charged until a fully-charged level is reached, (b) a time at the fully-charged level is tracked, (c) the charging of the battery means is halted after a maximum full-charge time period is elapsed, and (d) the charging of the battery means is restarted after a pre-set charge level is reached, wherein the pre-set charge level is in a range of 10% to 25% of the fully-charged level so as to achieve battery conditioning.

14. The system of claim 13, further including means for tracking that comprises:

means for starting a timer when the fully-charged level is reached; and means for using a timer in determining whether the maximum full-charge time period is elapsed.

15. The system of claim 13, further comprising:

means for notifying a user when the charging of the battery means is stopped; and means for notifying the user when the charging of the battery means is resumed.

16. The system of claim 13, wherein the maximum full-charge time period and the pre-set charge level are configurable by way of a user interface.

17. The system of claim 13, wherein the discharging is temporarily disabled at option of a user.

* * * * *

UNITED STATES PATENT AND TRADEMARK OFFICE
CERTIFICATE OF CORRECTION

| | | |
|---|---|---|
| PATENT NO. | : 7,612,536 B2 | Page 1 of 1 |
| APPLICATION NO. | : 11/252669 | |
| DATED | : November 3, 2009 | |
| INVENTOR(S) | : Cary J. Hoffer et al. | |

It is certified that error appears in the above-identified patent and that said Letters Patent is hereby corrected as shown below:

In column 8, line 6, in Claim 13, delete "In" and insert -- in --, therefor.

Signed and Sealed this

Thirtieth Day of March, 2010

David J. Kappos
*Director of the United States Patent and Trademark Office*